Patented Oct. 29, 1940

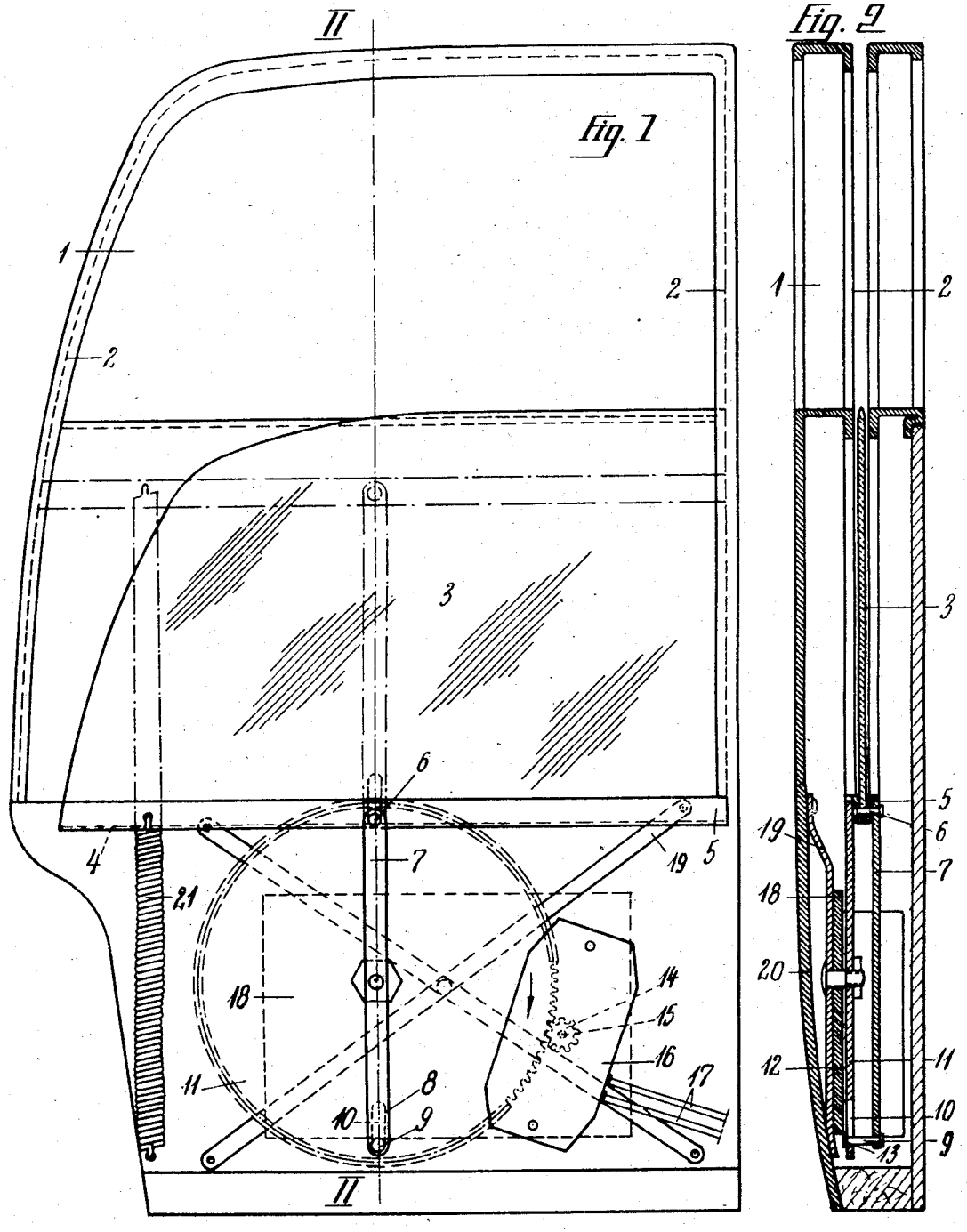

2,219,527

UNITED STATES PATENT OFFICE 2,219,527

DEVICE FOR OPENING AND CLOSING VEHICLE AND LIKE WINDOWS

Paul Mommer and Karl Mommer, Wuppertal-Elberfeld, Germany

Application November 9, 1937, Serial No. 173,713
In Germany June 15, 1937

3 Claims. (Cl. 268—124)

The present invention is concerned with a device for opening and closing the windows of vehicles and the like.

In the previous devices of this nature, the apparatus generally included gearing which was actuated by means of a hand-crank projecting through the wall of the door into the interior of the vehicle. The crank when operated caused two arms, which bore through rollers on the lower edge of the pane of window-glass, to move towards one another scissor-fashion.

With these devices it was impossible for the driver to open or close the windows during driving without endangering the automobile and its occupants. Furthermore, the form of gearing used was comparatively costly and unreliable. Amongst other drawbacks, the glass was very frequently broken, due to the fact that the window was only mounted loosely on the arms.

Again, the handle for operating the window projected into the interior of the vehicle and often proved an annoyance, and the fabric facing had to be applied from the interior of the automobile.

It is an object of the present invention to provide a device for opening and closing an automobile or other vehicle window by the simple process of making and breaking a circuit through a power source and the elimination of the usual projecting hand crank.

Another object of the invention is a vehicle door having a built-in motor and a crank rod attached to the window of the door and adapted to be driven by said motor. Thus the driver is able, during driving and merely by turning a knob, switch or the like on the dashboard, to open or close the window without interference with the driving, and moreover the extreme simplicity of the device ensures a safe and certain operation.

Another object of the invention is to pivot one end of the crank rod, the length of which corresponds to the distance between the upper edge of the window in the fully closed and in the fully opened position, to a toothed wheel mounted in the door and arranged to be driven through a spur wheel fastened on the shaft of the motor built into the door. When the circuit through the power source is made the motor and the spur wheel, and consequently the toothed wheel, are set into motion and the crank rod pushes the window up until the topmost position of the latter is reached. If the power source is then cut out the window remains in its new position, or otherwise the crank rod will be moved downwards again taking the window with it. This process can be repeated as many times as is considered desirable to bring the window into the required position. It is immaterial whether this coincides with either of the end positions or any intermediate position of the window, since the latter invariably remains fixed when the motor is cut off.

Another object of the invention is to provide a motor of the reversible type for operating the crank with an alternative forward or backward movement, so that the window can be brought back from an intermediate position into the opened position without having first to assume the closed position, or vice versa. The reversal of the motor may be effected by means of a switch arranged on the instrument or dash board of the vehicle.

In order to enable the same toothed wheel to be employed for the most varied lengths of window movement, this wheel is given a longitudinal slot in which is mounted, so as to be capable of adjustment and setting therein, the pivot pin of the crank rod. In the case of windows with a small total movement, the pin, and with it the rod, is moved upwards and fixed at the upper part of the slot, whereas in the case of windows with a greater total movement it is moved downwards before being fixed.

It is a further object of the invention to obtain a satisfactory guidance of the windows, and in the case of unilaterally-guided windows to prevent tilting of the latter. To this end, a helical spring is engaged with the lower free end of the window and this spring is secured by its other extremity to the interior of the door at the lower portion. When the window is raised or lowered, the spring maintains it in a horizontal position.

The accompanying drawing illustrates one embodiment of the invention. In the drawing, Figure 1 is a front view of the device showing it built into the door of an automobile (with the fabric covering omitted for the sake of clarity).

Figure 2 is a section on the line II—II of Fig. 1;

Figure 3 is a diagram of the electrical connections of the device.

As illustrated in the drawing, the window 3 is adapted to be moved up and down in the door 1 and is guided in the guideways 2. A metal band 5 embraces the lower edge 4 of the window, and a bolt 6 passes through both the band 5 and the window pane and carries the crank rod 7.

A further bolt 9 passes through the lower end 8 of the rod 7 and into a slot 10 in a toothed wheel 11, and a nut 13 is screwed on to a threaded part of the bolt 9 on the far side of the wheel 11.

A spur wheel 14 meshes with the teeth of wheel 11, this spur wheel being mounted on the shaft 15 of a motor 16 of any suitable and usual type. Leads 17 run from this motor by way of a power source, for example a battery 22, to a switch 23 arranged on the instrument board or dash board of the automobile. The battery and switch are diagrammatically illustrated in Fig. 3.

The toothed wheel 11 and the motor 16 are attached to a common plate 18 inside the door 1, and this plate is welded to brackets 19 fastened to the sheet metal cover 20 of the door.

Apart from the rod 7, the lower edge 4 of the window 3 is engaged by a spring 21, the other end of which is attached to the inside of the cover sheet 20.

The device described above functions in the following fashion.

If the switch 23 diagrammatically illustrated in Fig. 3 is turned in the direction of arrow I, the circuit $a$ is closed and the motor 16 set into operation, thus causing rotation of the planet wheel 14 and consequently of wheel 11. As a result, the slot 10 is carried round and imparts a corresponding movement to the rod 7 so that the window 3 is raised. It is obvious that after the slot 10 or bolt 9 has reached its topmost position, further movement lowers instead of raises the window.

When the switch is returned to its middle position in Fig. 3 the circuit is broken and the window remains in the position which it has been led to occupy.

It is seen from inspection of Fig. 3 that rotation of the switch in the direction of arrow II closes a second circuit $b$ similar to circuit $a$. This second circuit includes a second motor 16 built in the other or another door of the automobile and arranged to operate the window of this door by means similar to those shown in Figs. 1 and 2. In the same way, therefore, the window of this second door will be moved until the switch 23 is returned from its right hand to its middle position.

Thus a driver of the automobile has only to turn the switch on the instrument or dash board one way or the other and the desired window is opened. The operation can readily be undertaken during actual driving, since the driver has only to take his hand momentarily from the steering wheel to operate switch 23.

While I have, in the above description, referred to one particular embodiment of my invention, it is to be understood that I do not wish to be limited thereto but only to those constructions comprehended within the scope of the appended claims.

What I claim and desire to secure by Letters Patent is:

1. A device for opening and closing windows of automotive vehicles comprising a frame having lower and upper portions, respectively, a mechanism housed in said lower portion and below said window, a lateral slideway extending from said upper portion into said lower portion for guiding one side edge of said window, said mechanism comprising an electric motor, a gear in operative connection with said motor, and a crank rod adjustably pivoted on said gear and connected with its free end to the lower edge of said window, and compressible spring means secured with one of its ends within said lower frame portion and connected with its other end to said lower edge of said window at a point adjacent the other side edge thereof, whereby upon rotation of said motor said window is continuously lowered and raised within said upper frame portion by said adjusted crank a predetermined distance and guided along said slideway against which said window is urged through the action of said spring means to prevent tilting thereof.

2. A device for opening and closing windows of automotive vehicles comprising a frame having lower and upper portions, respectively, a mechanism housed in said lower portion and below said window, a lateral slideway extending from said upper portion into said lower portion for guiding one side edge of said window, said mechanism comprising an electric motor, a gear in operative connection with said motor, and a crank rod adjustably pivoted on said gear and connected with its free end to the lower edge of said window, compressible spring means secured with one of its ends within said lower frame portion and connected with its other end to said lower edge of said window at a point adjacent the other side edge thereof, whereby upon rotation of said motor said window is continuously lowered and raised within said upper frame portion by said adjusted crank a predetermined distance and guided along said slideway against which said window is urged through the action of said spring means to prevent tilting thereof, and means for controlling rotation of said motor for selectively positioning said window during its up and down travel relatively to said slideway.

3. A device for opening and closing windows of automotive vehicles comprising a frame having lower and upper portions, respectively, a mechanism housed in said lower portion and below said window, a lateral slideway extending from said upper portion into said lower portion for guiding one side edge of said window, said mechanism comprising an electric motor, a gear in operative connection with said motor, and a crank rod adjustably pivoted on said gear and connected with its free end to the lower edge of said window, and spring means extensible and compressible within the space of said lower frame portion, one of the ends of said spring means being fixed within said lower portion and connected with its other end to said lower edge of said window at a point adjacent the other side edge thereof, whereby upon rotation of said motor said window is continuously lowered and raised within said upper frame portion by said crank adjusted for a path determined by the distance between the upper and lower edges of said window and guided along said slideway against which said window is urged through the action of said spring means to prevent tilting thereof.

PAUL MOMMER.
KARL MOMMER.